United States Patent [19]
Tuttle et al.

[11] Patent Number: 5,486,431
[45] Date of Patent: Jan. 23, 1996

[54] METHOD OF PRODUCING BUTTON-TYPE BATTERIES AND SPRING-BIASED CONCAVE BUTTON-TYPE BATTERY

[75] Inventors: John R. Tuttle; Mark E. Tuttle, both of Boise, Id.

[73] Assignee: Micron Communications, Inc., Boise, Id.

[21] Appl. No.: 206,051

[22] Filed: Mar. 2, 1994

[51] Int. Cl.⁶ .................................................. H01M 2/04
[52] U.S. Cl. .......................... 429/66; 429/175; 429/176; 29/623.2
[58] Field of Search ........................... 429/66, 162, 174, 429/175, 176; 29/623.2

[56] References Cited

U.S. PATENT DOCUMENTS

| | | | |
|---|---|---|---|
| 2,422,045 | 6/1947 | Ruben | 126/167 |
| 2,499,239 | 2/1950 | Williams | 429/66 |
| 2,712,565 | 7/1955 | Williams, Jr. | 136/107 |
| 2,951,891 | 9/1960 | Kempf | 136/169 |
| 3,076,860 | 2/1963 | Dickfeldt et al. | 429/162 |
| 3,096,217 | 7/1963 | Clune | 136/107 |
| 3,185,595 | 5/1965 | Schenk, Jr. | 136/133 |
| 3,440,110 | 4/1969 | Arbter | 136/166 |
| 3,457,117 | 6/1969 | Angelovich | 136/133 |
| 3,663,000 | 6/1972 | Ruetschi | 136/107 |
| 3,708,343 | 1/1973 | Walsh | 136/133 |
| 3,713,896 | 1/1973 | Feldhake | 136/133 |
| 3,741,813 | 6/1973 | Bergum et al. | 429/162 X |
| 3,799,959 | 3/1974 | Epstein | 260/429 |
| 3,891,462 | 6/1975 | Langkau | 136/111 |
| 3,935,026 | 1/1976 | Howard | 136/20 |
| 4,048,405 | 9/1977 | Megahed | 429/206 |
| 4,122,241 | 10/1978 | Ciliberti, Jr. et al. | 429/133 |
| 4,263,380 | 4/1981 | Riedl | 429/162 |
| 4,374,909 | 2/1983 | Tucholski | 429/174 |
| 4,632,887 | 12/1986 | Jung | 429/181 |
| 4,862,328 | 8/1989 | Morimoto et al. | 429/162 X |

FOREIGN PATENT DOCUMENTS

| | | | |
|---|---|---|---|
| 1099018 | 11/1959 | Germany . | |
| 2201811 | 1/1972 | Germany . | |
| 55-133761 | 10/1980 | Japan | 429/66 |
| 0531774 | 1/1941 | United Kingdom | 429/66 |

*Primary Examiner*—Stephen Kalafut
*Attorney, Agent, or Firm*—Wells, St. John, Roberts, Gregory & Matkin

[57] ABSTRACT

A button-type battery includes: a) an anode; b) a cathode positioned adjacent to the anode; c) a separator and electrolyte between the anode and the cathode; d) a conductive first terminal housing member in electrical contact with one of the anode or the cathode, the first terminal housing member having a surrounding periphery and a concave central portion intermediate of its surrounding periphery; e) a conductive second terminal housing member in electrical contact with the other of the anode or the cathode, the second terminal housing member having a surrounding periphery and a concave central portion intermediate of its surrounding periphery which is opposingly concave to the concave central portion of the first terminal housing member; and f) the first and second terminal housing members being insulatingly joined and sealed at their respective peripheries to form an enclosed housing which retains and protects the anode, cathode, separator and electrolyte, with the concave central portions of the first and second terminal housing members projecting inwardly toward one another forming opposing inwardly sprung conductive terminals compressively forcing the anode, separator and cathode together. Methods of production are also disclosed.

32 Claims, 3 Drawing Sheets

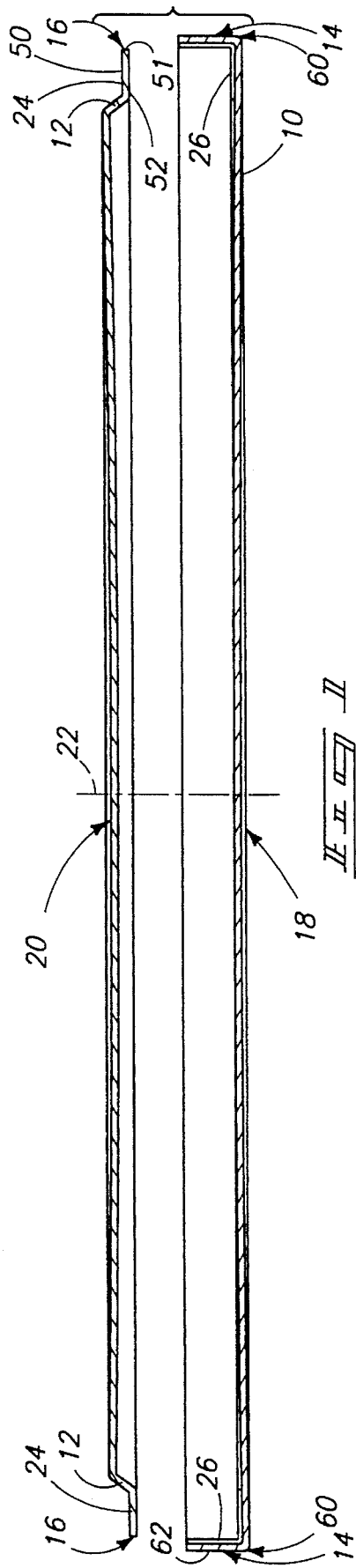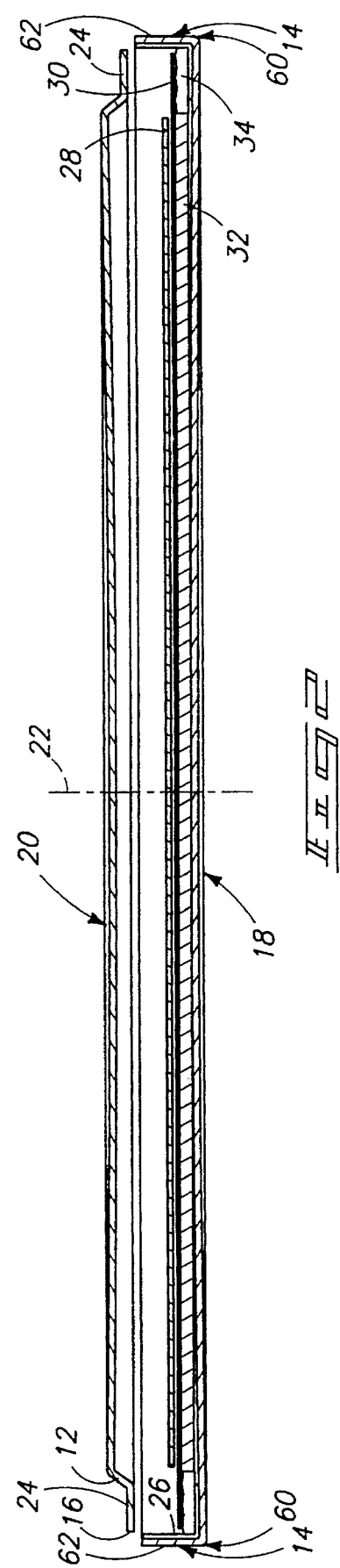

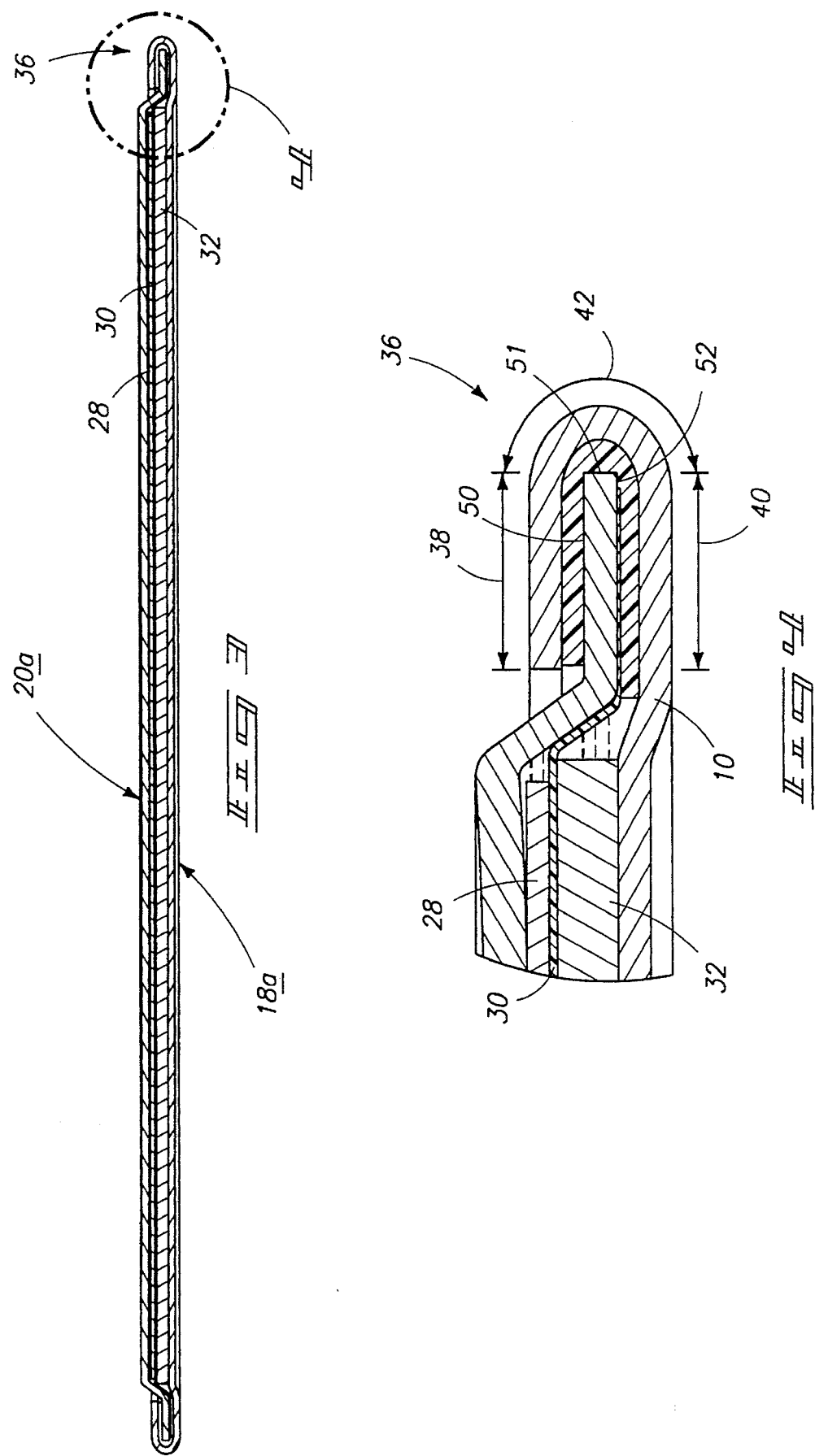

METHOD OF PRODUCING BUTTON-TYPE BATTERIES AND SPRING-BIASED CONCAVE BUTTON-TYPE BATTERY

TECHNICAL FIELD

This invention relates to button-type batteries.

BACKGROUND OF THE INVENTION

Button-type batteries are small thin energy cells that are commonly used in watches and other electronic devices requiring a thin profile. A conventional button-type battery includes an anode, a cathode, a porous separator separating the anode and cathode, and an electrolyte within the separator pores.

These internal battery components are housed within a metal casing or housing formed by a lower conductive can and an upper conductive lid. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically insulate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

It is also an objective in button-type battery design to create a housing structure which physically compresses the anode, separator, and cathode together to insure proper operation of the energy cell. This is typically accomplished in the prior art by a separate internal spring component which provides desired compressive forces.

It would be desirable to design improved button-type batteries of very thin profile which meet at least one or more of the above stated objectives.

BRIEF DESCRIPTION OF THE DRAWINGS

Preferred embodiments of the invention are described below with reference to the following accompanying drawings. The same components and features illustrated throughout the drawings are referenced with like numerals.

FIG. 1 is a side cross-sectional view of battery components constructed in accordance with the invention.

FIG. 2 is a side cross-sectional view of battery components constructed and arranged in accordance with the invention.

FIG. 3 is a side cross-sectional view of a button-type battery in accordance with the invention.

FIG. 4 is an enlarged cross-sectional view of a peripheral sealing portion of the FIG. 3 button-type battery assembly.

DETAILED DESCRIPTION OF THE PREFERRED EMBODIMENTS

Figure 5:
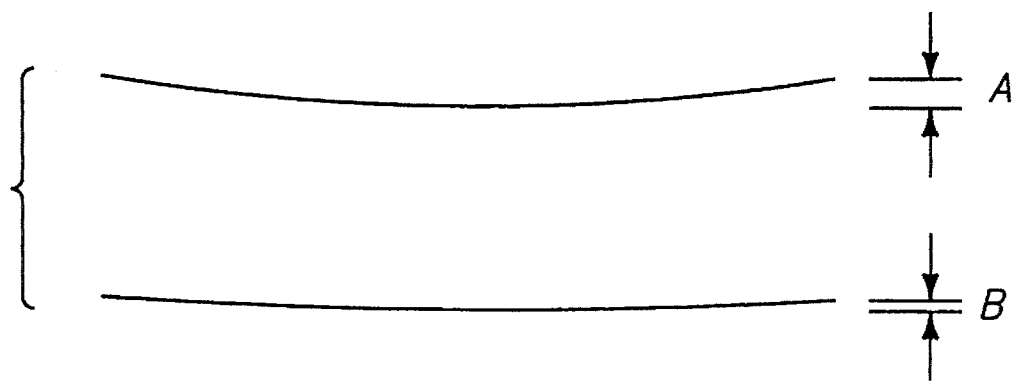
FIG. 5 is a diagrammatic representation of pre-assembly and post-assembly concavity of one component of a button-type battery in accordance with the invention.

This disclosure of the invention is submitted in furtherance of the constitutional purposes of the U.S. Patent Laws "to promote the progress of science and useful arts" (Article 1, Section 8).

This invention concerns "coin" or "button-type" batteries. A button-type battery is typically a small circular-shaped energy cell approximately the size of a coin. The button-type battery can be constructed in different sizes, with typical diameters being 12 mm, 16 mm, and 20 mm. Other shapes are possible, but the circular shape is most common.

In accordance with one aspect of the invention, a button-type battery comprises:

an anode;

a cathode positioned adjacent to the anode;

a separator and electrolyte between the anode and the cathode;

a conductive first terminal housing member in electrical contact with one of the anode or the cathode, the first terminal housing member having a surrounding periphery and a concave central portion intermediate of its surrounding periphery;

a conductive second terminal housing member in electrical contact with the other of the anode or the cathode, the second terminal housing member having a surrounding periphery and a concave central portion intermediate of its surrounding periphery which is opposingly concave to the concave central portion of the first terminal housing member; and the first and second terminal housing members being insulatingly joined and sealed at their respective peripheries to form an enclosed housing which retains and protects the anode, cathode, separator and electrolyte, with the concave central portions of the first and second terminal housing members projecting inwardly toward one another forming opposing inwardly sprung conductive terminals compressively forcing the anode, separator and cathode together.

In accordance with another aspect of the invention, at least one of the central portions of the conductive first terminal housing member or the second terminal housing member is inwardly concave forming an inwardly sprung conductive terminal compressively forcing the anode, separator and cathode together within the housing.

Research culminating in the invention disclosed herein also resulted in other inventions. These other inventions are the subject of other U.S. patents which spawned from patent applications filed on the same day of the patent application from which this U.S. patent matured. These other patent applications are U.S. patent application Ser. No. 08/205,590, "Methods Of Producing Button-Type Batteries And A Plurality Of Battery Terminal Housing Members", listing Rickie Lake and Peter M. Blonsky as inventors. U.S. patent application Ser. No. 08/205,611, "Button-Type Battery With Improved Separator And Gasket Construction", listing Peter M. Blonsky and Mark E. Tuttle as inventors and U.S. patent application Ser. No. 08/205,957, "Button-Type Battery Having Bendable Construction, and Angled Button-Type Battery", listing Mark E. Tuttle and Peter M. Blonsky as inventors (now U.S. Pat. No. 5,432,027). These co-filed patent applications and resulting patents are hereby incorporated by reference as if fully included herein.

Referring to the drawings, FIG. 1 illustrates a conductive first terminal housing member 10 and a conductive second terminal housing member 12. First terminal housing member 10 includes a surrounding periphery 14, while second housing member 12 includes a surrounding periphery 16. Surrounding periphery 14 is defined by a peripheral bend 60° of 90° or less which produces outwardly projection portions 62, and thereby defines a container-like construction. First terminal member 10 also has a pre-formed concave central portion 18 intermediate its surrounding periphery 14 which extends inwardly from its outer surface.

Second terminal housing member 12 comprises a lid for first terminal housing member 12, and has a concave central portion 20 intermediate its surrounding periphery 16 which also extends inwardly from its outer surface. Accordingly, at least one of the central portions of the housing members is concave, with a preference being that both are concave. Housing members 10 and 12 are arranged such that their concavities inwardly oppose one another. For purposes of the continuing discussion, original concavity of central portion 18 is to a first degree, while original concavity of central portion 20 is to a fourth degree. Preferably, the first and fourth degrees of concavity are the same. Specifically, each concavity is preferably substantially arcuate in shape, having a radius of curvature less than or equal to about 400 mm, with less than or equal to 200 mm being most preferred.

First terminal housing member 10 and second terminal housing member 12 are each preferably formed from a metal sheet having a thickness less than about 8 mils, and preferably in a range of from about 3 mils to 5 mils. An example material includes Type 304 stainless steel having 4 mils thickness.

First terminal member 10 and second terminal member 12 are aligned along a common central axis 22. Second terminal housing member 12 includes an annular planar periphery portion 24 effectively projecting substantially radially outward relative to the central axis 22. For purposes of the continuing discussion, periphery portion 24 includes three sides 50, 51 and 52. First terminal housing member 10 includes and annular adhered gasket material 26. Such is preferably provided in a manner described in our U.S. patent application Ser. No. 08/205,590, entitled "Methods Of Producing Button-Type Batteries And A Plurality Of Battery Terminal Housing Members", listing Rickie Lake and Peter M. Blonsky as inventors. In forming first terminal housing member 10 with adhered gasket material 26, the cutting and forming step of our "Methods Of Producing Button-Type Batteries And A Plurality Of Battery Terminal Housing Members" patent would most preferably be provided with a lower convexly domed portion to produce central concave portion 18.

Referring to FIG. 2, an anode 28, separator 30 and cathode 32 are positioned within first terminal housing member (container) 10. Liquid electrolyte 34 is also provided within housing 10. Anode 28 will be in electrical contact with concave central portion 20 of the second terminal housing member 12, while cathode 32 will be in electrical contact with concave central portion 18 of first terminal housing member 10. Anode 28, separator 30 and cathode 32 are centrally aligned along transverse central axis 22.

Cathode 32 is formed of a compressed tablet made from a combination of manganese (IV) oxide, carbon, and teflon powder. An example preferred thickness of cathode 33 is 8 mils (0.2032 mm). Separator 30 is a woven or porous polymeric material, such as polyethylene, polypropylene, or teflon. An example preferred thickness of separator 30 is 1 mil (0.0254 mm). Anode 28 is formed of elemental lithium provided on a copper backed foil. An example thickness of anode 28 is 2 mils (0.0508 mm).

An example electrolyte 34 comprises a solution of propylene carbonate and ethylene glycol dimethylether, having dissolved lithium tetrafluoroborate. Suitable electrolyte components are supplied by Aldrich Chemical Company of Milwaukee, Wis. The volume of electrolyte 34 provided within first terminal housing member 10 is preferably gauged to fill the substantial void within housing member 10, yet not so great to leak out upon crimp sealing the battery assembly.

Referring to FIG. 3, first and second terminal housing members 10 and 12 are insulatingly joined and sealed at their respective peripheries to form an enclosed housing which retains and protects the anode cathode separator and electrolyte. The preferred manner of joining and sealing the battery is as described in our "Methods Of Producing Button-Type Batteries And A Plurality Of Battery Terminal Housing Members" patent. The joining results in the first terminal housing member periphery wrapping around the three sides of the second terminal housing member periphery.

Specifically, second housing member 12 is pressed downwardly somewhat while peripheral portions 62 of first terminal housing member 10 are further bent inwardly from 90° about peripheral bend 60. In the preferred embodiment, the initial bend past 90° is by an additional 30°. This partial crimp effectively, if only temporarily, holds second terminal housing member 12 in a desired position with anode 28, separator 30 and cathode 32 therebeneath. Further, this initial bend past 90° is understood to temporarily impart additional or increased arcuate concavity to circular central base portion 18 in the illustrated upward direction to a second degree from flatness. This results from a combination of the thickness of the central portion and the radius of bend 60 being in combination effectively small or diminutive that the resultant compressive stresses cause such upward contraction. An example radius of curvature in accordance with the above described preferred embodiment is 3.5 mils (0.0889 mm). The additional concave bending is believed to be temporary because continued bending of the peripheral portions of a flat-bottom, empty first terminal housing member results in flattening of the arc and overall less indentation.

From the pre-crimp stage, sealing peripheral portions 62 of first terminal housing member 10 are further bent about peripheral bend 60 to form a single continuous peripheral bend which effectively crimps first and second terminal housing members 10 and 12 together. Such effectively forms an enclosed battery housing with gasket material and separator material being interposed between the first and second terminal housing members to provide a fluid-tight seal and to provide electrical insulation therebetween. A battery made in accordance with the above example thickness components will have a finished total thickness of 0.5 mm (19.7 mils).

One known prior art button-type battery (no available literature) is known to utilize a bottom can having an indented central bottom surface. However, the indented surface is not understood to impart any inward compressive spring force to the internal components. Accordingly, this prior art button-type battery is believed to be no more pertinent than that disclosed in U.S. Pat. No. 2,422,045.

Referring with more specificity to the drawings, the joined first terminal housing member 10 (FIG. 3) comprises a peripheral portion 36 having two substantially planar and parallel opposing segments 38 and 40. First terminal housing member peripheral portion 36 further includes a continuously bending segment 42 interconnecting the substantially planar and parallel segments 38 and 40. Such a construction effectively wraps around the three sides 50, 51 and 52 of second terminal housing member periphery 24. In the illustrated and preferred embodiment, second terminal housing periphery 24 and segments 38 and 40 are all substantially parallel.

The concave central portions of first and second terminal housing members 10 and 12 project inwardly toward one another forming opposing inwardly sprung conductive terminals which compressively force the anode separator and cathode together. Such is accomplishable in very thin batteries, such as less than 1 mm or even less then 0.5 mm, to provide a battery void of any :internal spring component but for the opposing concavity of the first and second terminal housing members.

The concave indentations of original central portions 18 and 20 will diminish in degree, even to the point of indented flatness or planarity, upon final engagement and crimping as illustrated in FIG. 3. These portions are correspondingly designated with numerals 18a and 20a. The original preformed concavity still, however, provides the inward resilient spring force which compressively holds the internal components of the battery together in tight juxtaposition.

Such is further diagrammatically shown and described with reference to FIGS. 5 and 6. The upper line of FIG. 5 diagrammatically illustrates the preferred embodiment central portion of second terminal housing member 12 being downwardly concave to the stated starting fourth degree of concavity, designated "A". The lower line of FIG. 5 diagrammatically illustrates the resultant or assembled concavity to the fifth degree, designated "B", which is less than the fourth degree.

Figure 6:
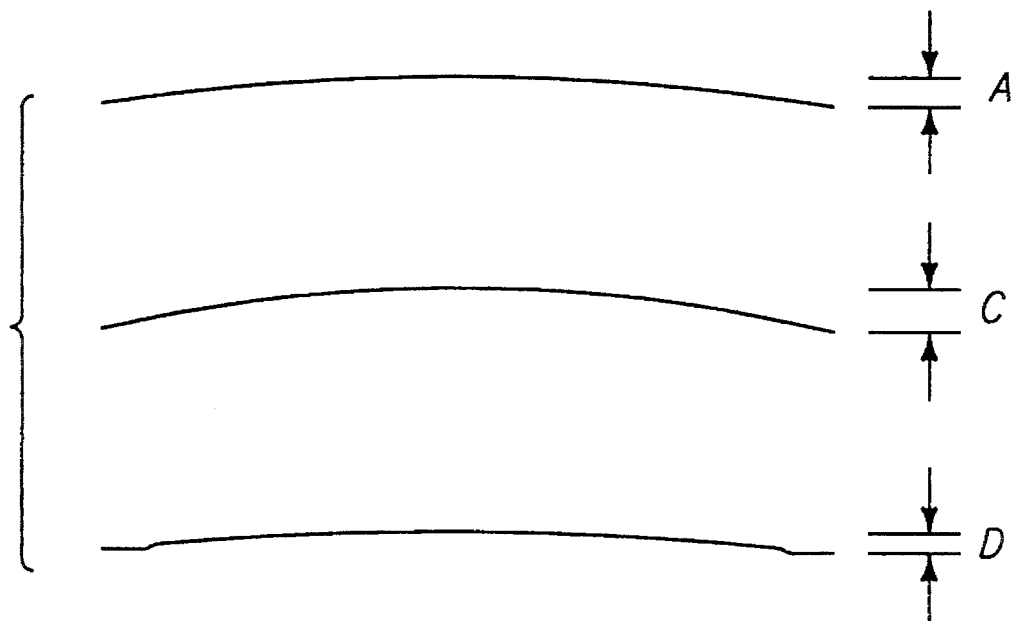
FIG. 6 is a diagrammatic representation of pre-assembled, mid-assembly and post-assembly concavity of another component of a button-type battery in accordance with the invention.

The upper line of FIG. 6 diagrammatically illustrates the stated starting first degree of concavity. Such is designated with the letter "A" as in the preferred embodiment the central starting concavities of first housing member 10 and second housing member 12 are the same. The middle line of FIG. 6 represents the stated second degree of concavity, designated "C", which is greater than first concavity "A". The bottom line represents the assembled stated third degree of concavity, designated "D", which is less than "A" but greater than "B".

Property rights are also asserted in methods of forming button-type batteries, as evidenced by the concluding claims.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A button-type battery comprising:
   an anode;
   a cathode positioned adjacent to the anode;
   a separator and electrolyte between the anode and the cathode; a conductive first terminal housing member in electrical contact with one of the anode or the cathode, the first terminal housing member having a surrounding periphery and a concave central portion intermediate of its surrounding periphery;
   a conductive second terminal housing member in electrical contact with the other of the anode or the cathode, the second terminal housing member having a surrounding periphery and a concave central portion intermediate of its surrounding periphery which is opposingly concave to the concave central portion of the first terminal housing member; and
   the first and second terminal housing members being insulatingly joined and sealed at their respective peripheries to form an enclosed housing which retains and protects; the anode, cathode, separator and electrolyte, with the concave central portions of the first and second terminal housing members projecting inwardly toward one another forming opposing inwardly sprung conductive terminals compressively forcing the anode, separator and cathode together.

2. A button-type battery according to 1 wherein the concave central portions at least prior to joining are arcuately shaped.

3. A button-type battery according to 1 wherein the concave central portions at least prior to joining are arcuately shaped, with each having some radius of curvature, less than or equal to about 400 millimeters.

4. A button-type battery according to 1 wherein the button-type battery is void of any internal spring component but for the opposing concavity of the first and second terminal housing members.

5. A button-type battery according to 1 wherein the first and second terminal housing members are formed of metal sheets having thicknesses of less than 8 mils.

6. A button-type battery according to claim 1 wherein a total combined thickness of the anode, the cathode, the separator, and the first and second terminal housing members is less than 1 millimeter.

7. A button-type battery according to claim 1 wherein a total combined thickness of the anode, the cathode, the separator, and the first and second terminal housing members is approximately 0.5 millimeter or less.

8. A button-type battery according to claim 1 wherein a total combined thickness of the anode, the cathode, the separator, and the first and second terminal housing members is less than 1 millimeter; and being void of any internal spring component but for the opposing concavity of the first and second terminal housing members.

9. A button-type battery according to claim 1 wherein a total combined thickness of the anode, the cathode, the separator, and the first and second terminal housing members is approximately 0.5 millimeter or less; and being void of any internal spring component but for the opposing concavity of the first and second terminal housing members.

10. A button-type battery according to 1 wherein the first and second terminal housing members are formed of metal sheets having thicknesses in a range from about 3 mils to 5 mils, with the battery being void of any internal spring component but for the opposing concavity of the first and second terminal housing members.

11. A button-type battery according to 1 wherein,
   the concave central portions at least prior to joining are arcuately shaped, with each having some radius of curvature less than or equal to about 400 millimeters; and
   the first and second terminal housing members are formed of metal sheets having thicknesses of less than 8 mils, with the battery being void of any internal spring component but for the opposing concavity of the first and second terminal housing members.

12. A button-type battery according to 1 wherein, the concave central portions at least prior to joining are arcuately shaped, with each having some radius of curvature less than or equal to about 400 millimeters; and the first and second terminal housing members are formed of metal sheets having thicknesses in a range from about 3 mils to 5 mils, with the battery being void of any internal spring component but for the opposing concavity of the first and second terminal housing members.

13. A button-type battery according to claim 1 wherein:

the anode and cathode are aligned along a transverse central axis;

the second terminal housing member periphery is planar and projects substantially radially outward from the central axis;

the first terminal housing member periphery wraps around three sides of the second terminal housing member periphery, the first terminal housing member periphery having two substantially planar segments on opposing sides of the second terminal housing member periphery and a continuously bending segment on a third side of the second terminal housing member periphery connecting the two substantially planar segments.

14. A button-type battery according to claim 13 wherein the planar second terminal housing member periphery and the two substantially planar segments of the first terminal housing member periphery are all substantially in parallel.

15. A button-type battery according to 13 wherein the concave central portions at least prior to joining are arcuately shaped.

16. A button-type battery according to 13 wherein the concave central portions at least prior to joining are arcuately shaped, with each having some radius of curvature less than or equal to about 400 millimeters.

17. A button-type battery according to 13 wherein the button-type battery is void of any internal spring component but for the opposing concavity of the first and second terminal housing members.

18. A button-type battery according to 13 wherein the first and second terminal housing members are formed of metal sheets having thicknesses of less than 8 mils.

19. A button-type battery according to claim 13 wherein a total combined thickness of the anode, the cathode, the separator, and the first and second terminal housing members is less than 1 millimeter.

20. A button-type battery according to claim 13 wherein a total combined thickness of the anode, the cathode, the separator, and the first and second terminal housing members is approximately 0.5 millimeter or less.

21. A button-type battery according to claim 13 wherein a total combined thickness of the anode, the cathode, the separator, and the first and second terminal housing members is less than 1 millimeter; and being void of any internal spring component but for the opposing concavity of the first and second terminal housing members.

22. A button-type battery according to claim 13 wherein a total combined thickness of the anode, the cathode, the separator, and the first and second terminal housing members is approximately 0.5 millimeter or less; and being void of any internal spring component but for the opposing concavity of the first and second terminal housing members.

23. A button-type battery according to 13 wherein the first and second terminal housing members are formed of metal sheets having thicknesses in a range from about 3 mils to 5 mils, with the battery being void of any internal spring component but for the opposing concavity of the first and second terminal housing members.

24. A button-type battery according to 13 wherein, the concave central portions at least prior to joining are arcuately shaped, with each having some radius of curvature less than or equal to about 400 millimeters; and the first and second terminal housing members are formed of metal sheets having thicknesses of less than 8 mils, with the battery being void of any internal spring component but for the opposing concavity of the first and second terminal housing members.

25. A button-type battery according to 13 wherein, the concave central portions at least prior to joining are arcuately shaped, with each having some radius of curvature less than or equal to about 400 millimeters; and the first and second terminal housing members are formed of metal sheets having thicknesses in a range from about 3 mils to 5 mils, with the battery being void of any internal spring component but for the opposing concavity of the first and second terminal housing members.

26. A button-type battery comprising:

an anode;

a cathode positioned adjacent to the anode;

a separator and electrolyte between the anode and the cathode;

a conductive first terminal housing member in electrical contact with the cathode, the first terminal housing member having a surrounding periphery and a central portion intermediate of its surrounding periphery;

a conductive second terminal housing member in electrical contact with the anode, the second terminal housing member having a surrounding periphery and a central portion intermediate of its surrounding periphery; and the first and second terminal housing members being insultingly joined and sealed at their respective peripheries to form an enclosed housing which retains and protects the anode, cathode, separator and electrolyte; the central portion of the conductive first terminal housing member being inwardly concave forming an inwardly sprung conductive terminal compressively forcing the anode, separator and cathode together within the housing.

27. A method of forming a button-type battery comprising the following steps:

providing a conductive first terminal housing member having a surrounding periphery and a central portion intermediate its surrounding periphery; the first terminal housing member forming a container within which is received an anode, a cathode positioned adjacent to the anode, and a separator and electrolyte between the anode and the cathode; the first terminal housing member central portion being in electrical contact with one of the anode or the cathode;

providing a conductive second terminal housing member having a surrounding periphery and a central portion intermediate its surrounding periphery, the second terminal member forming a lid for the first terminal housing member container, the second terminal housing member central portion having an outer surface and being concave to a first degree from its outer surface in the direction of the first terminal housing member container;

positioning the second terminal housing member lid and the first terminal housing member container with the anode, the cathode, separator and electrolyte therewithin in sealing juxtaposition to one another; and insulatingly joining and sealing the second terminal housing member juxtaposed lid and the first terminal housing member container at their respective peripheries to form an enclosed housing which retains and protects the anode, cathode, separator and electrolyte; the other of the anode or the cathode being in electrical contact with the second terminal housing member central portion; the concave central portion of the joined second terminal housing member applying an inward spring force compressively forcing the anode, separator and cathode together during a combination of the positioning and joining and sealing steps; the concave central portion of the joined second terminal housing member being concave to a second degree from its outer surface in the direction of the first terminal member container, the second degree being less than the first degree.

28. The method of forming a button-type battery of claim 27 wherein the first degree concavity is less than or equal to about 400 millimeters.

29. A method of forming a button-type battery comprising the following steps:

providing a conductive first terminal housing member having a surrounding periphery and a central portion intermediate its surrounding periphery; the surrounding periphery including a peripheral bend of 90° or less producing outwardly projecting portions which define a container; an anode, a cathode positioned adjacent to the anode, and a separator and electrolyte between the anode and the cathode being provided within the container; the first terminal housing member central portion being in electrical contact with one of the anode or the cathode; the first terminal housing member central portion having an outer surface and being concave to a first degree from its outer surface in the direction of the first terminal housing member projecting portions;

providing a conductive second terminal housing member having a surrounding periphery and a central portion intermediate its surrounding periphery, the second terminal member forming a lid for the first terminal housing member container;

positioning the second terminal housing member lid and the first terminal housing member container with the anode, the cathode, separator and electrolyte therewithin in sealing juxtaposition to one another; and with the second terminal housing member lid and the first terminal housing member container being in sealing juxtaposition, bending the first terminal housing member projecting portions about the peripheral bend beyond 90°, the first terminal housing member being formed of a sheet having a thickness, the first sheet thickness and peripheral bend radius in combination being effectively diminutive to increase concavity of the first terminal member central portion to a second degree as a direct result of such bending;

further bending the first terminal housing member projecting portions about the peripheral bend to seal the lid and container together at their peripheries into a sealed battery enclosure; the other of the anode or the cathode being in electrical contact with the second terminal housing member central portion; the concave central portion of the joined first terminal housing member applying an inward spring force compressively forcing the anode, separator and cathode together during a combination of the positioning, bending and further bending steps; the concave central portion of the joined first terminal housing member being concave to a third degree from its outer surface in the direction of the second terminal member container, the third degree being less than each of the first and second degrees.

30. The method of forming a button-type battery of claim 29 wherein the first degree concavity is less than or equal to about 400 millimeters.

31. The method of forming a button-type battery of claim 29 wherein the second terminal housing member is provided with a central portion which is concave in a fourth degree from its outer surface in the direction of the first terminal housing member container prior to the steps of positioning, bending and further bending; the concave central portion of the joined second terminal housing member applying an inward spring force compressively forcing the anode, separator and cathode together during a combination of the positioning, bending and further bending steps; the concave central portion of the joined second terminal housing member being concave to a fifth degree from its outer surface in the direction of the first terminal member container, the fifth degree being less than each of the first and second degrees.

32. The method of forming a button-type battery of claim 29 wherein the first and fourth degree concavities are individually less than or equal to about 400 millimeters.

* * * * *